(12) United States Patent
Kasamatsu

(10) Patent No.: US 7,880,602 B2
(45) Date of Patent: Feb. 1, 2011

(54) IMAGE DISPLAY CONTROL APPARATUS

(75) Inventor: Katsunori Kasamatsu, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 369 days.

(21) Appl. No.: 12/071,786

(22) Filed: Feb. 26, 2008

(65) Prior Publication Data

US 2008/0211654 A1 Sep. 4, 2008

(30) Foreign Application Priority Data

Mar. 1, 2007 (JP) .............................. 2007-052049

(51) Int. Cl.
G09F 9/00 (2006.01)
(52) U.S. Cl. ...................... 340/461; 340/988; 345/618; 345/625; 345/637; 701/211; 348/333.01; 348/333.02; 348/333.03; 348/333.04; 348/333.05
(58) Field of Classification Search ................ 340/461, 340/988, 990, 438–441, 445–448; 701/211, 701/45–48; 345/618, 625, 637; 348/333.01–333.05
See application file for complete search history.

(56) References Cited

U.S. PATENT DOCUMENTS

| 4,700,181 | A * | 10/1987 | Maine et al. ................. 345/539 |
| 5,757,268 | A * | 5/1998 | Toffolo et al. ................ 340/461 |
| 6,119,060 | A * | 9/2000 | Takayama et al. ............. 701/36 |
| 6,487,493 | B2 * | 11/2002 | Uekawa et al. ............... 701/200 |
| 6,538,622 | B1 * | 3/2003 | Kojima et al. .................. 345/7 |
| 6,897,856 | B2 * | 5/2005 | Inaba et al. .................. 345/204 |
| 7,557,800 | B2 * | 7/2009 | Yanagisawa ................. 345/173 |
| 7,606,663 | B2 * | 10/2009 | Neef et al. .................... 701/211 |
| 2002/0138180 | A1 * | 9/2002 | Hessing et al. .................. 701/1 |
| 2003/0078724 | A1 * | 4/2003 | Kamikawa et al. .......... 701/208 |
| 2003/0231259 | A1 * | 12/2003 | Yui et al. ..................... 348/564 |
| 2005/0179532 | A1 * | 8/2005 | Nagai et al. .................. 340/461 |
| 2006/0055525 | A1 * | 3/2006 | Kubota et al. ............... 340/461 |
| 2006/0271286 | A1 * | 11/2006 | Rosenberg ................... 701/211 |
| 2009/0179745 | A1 * | 7/2009 | Okamoto et al. .......... 340/425.5 |

FOREIGN PATENT DOCUMENTS

| JP | A-06-266993 | 9/1994 |
| JP | A 10-272989 | 10/1998 |
| JP | A 11-118497 | 4/1999 |
| JP | A 2000-168474 | 6/2000 |
| JP | A 2000-357300 | 12/2000 |
| JP | A 2002-225592 | 8/2002 |
| JP | A 2004-151026 | 5/2004 |
| JP | A-2005-003870 | 1/2005 |
| JP | A-2005-041355 | 2/2005 |
| JP | A 2006-221339 | 8/2006 |
| JP | A 2007-145137 | 6/2007 |

* cited by examiner

*Primary Examiner*—Benjamin C Lee
*Assistant Examiner*—Quang Pham
(74) *Attorney, Agent, or Firm*—Oliff & Berridge, PLC

(57) ABSTRACT

An image-data loading unit loads image data of an image requested to be displayed based on an input signal in an image memory. A display-image determining unit determines an image to be displayed on the display device based on a priority of the image after the image data is loaded in the image memory. An image-data output unit reads out the image data of the image determined to be displayed by the display-image determining unit from the image memory, and outputs read image data to a display device.

12 Claims, 15 Drawing Sheets

FIG.2

APPLICATION IMAGE PROPERTIES

| TYPE OF APPLICATION | LEVEL OF URGENCY | DISPLAY PRIORITY | IMAGE DRAWING AREA | DISPLAY CONTENT | IMAGE DRAWING TIMING |
|---|---|---|---|---|---|
| SAFETY-RELATED APPLICATION | HIGH | 1 | FIXED-IMAGE DRAWING AREA | FIXED IMAGE: RED WARNING SIGN AND FIXED MESSAGE | AT SYSTEM START-UP |
| | MEDIUM | 2 | FIXED-IMAGE DRAWING AREA AND VARIABLE-IMAGE DRAWING AREA | FIXED IMAGE: YELLOW WARNING SIGN AND VARIABLE IMAGE: VARIABLE MESSAGE | FIXED IMAGE: AT SYSTEM START-UP VARIABLE IMAGE: ON OCCURRENCE OF EVENT |
| | LOW | 3 | VARIABLE-IMAGE DRAWING AREA | VARIABLE IMAGE: VARIABLE MESSAGE AND CAMERA-SHOT IMAGE etc. | ON OCCURRENCE OF EVENT |
| NORMAL APPLICATION | — | 4 | VARIABLE-IMAGE DRAWING AREA | VARIABLE IMAGE: MESSAGE OUTPUT BY NORMAL APPLICATION | ON OCCURRENCE OF EVENT |

FIG.3

SAFETY-RELATED APPLICATION PROPERTIES

| TYPE OF APPLICATION | LEVEL OF URGENCY | DISPLAY PRIORITY AMONG SAFETY-RELATED APPLICATIONS | DISPLAY CONTENT |
|---|---|---|---|
| SAFETY-RELATED APPLICATION | HIGH | 1 | WARNING OF CRASH |
| | | | NOTICE OF DANGEROUS OBJECT |
| | | | ⋮ |
| | MEDIUM | 2 | WARNING OF SUDDEN BRAKING |
| | | | WARNING OF SPEEDING |
| | | | ⋮ |
| | LOW | 3 | WATCH ON OBSTACLE AHEAD |
| | | | WATCH ON OBSTACLE BEHIND BEFORE YOU BACK |
| | | | WATCH ON OBSTACLE BOTH WAYS BEFORE YOU TURN LEFT OR RIGHT |
| | | | WATCH ON OBSTACLE AROUND |
| | | | ⋮ |

FIG.4

NORMAL APPLICATION PROPERTIES

| TYPE OF APPLICATION | DISPLAY PRIORITY AMONG NORMAL APPLICATIONS | DISPLAY CONTENT |
|---|---|---|
| NORMAL APPLICATION | 1 | GUIDANCE |
| | 2 | DESTINATION SETTING |
| | 3 | TRAFFIC INFORMATION |
| | 4 | NAVIGATION OPERATION |
| | 5 | AIR CONDITIONING OPERATION |
| | 5 | AUDIO OPERATION |
| | 5 | VIDEO OPERATION |
| | ⋮ | ⋮ |

FIG.5

SYNCHRONIZED-SOUND PROPERTIES

| TYPE OF APPLICATION | LEVEL OF URGENCY | SOUND-OUTPUT PRIORITY | START TRIGGER | TYPE OF SOUND | OUTPUT TIMING | APPLICATION PROCESSING |
|---|---|---|---|---|---|---|
| SAFETY-RELATED APPLICATION | HIGH | 1 | EVENT IN VEHICLE | BEEP SOUND | OUTPUT IN SYNCHRONIZATION WITH DISPLAY | CALL BEEP-SOUND CONTROL |
| | MEDIUM | 2 | | INTERRUPT SOUND | AFTER DISPLAY ADJUSTMENT, OUTPUT IN SYNCHRONIZATION WITH DISPLAY | REGISTER START POINTER OF SOUND DATA IN INTERRUPT SOUND MANAGEMENT |
| | LOW | 3 | | | AFTER DISPLAY ADJUSTMENT, OUTPUT IN SYNCHRONIZATION WITH DISPLAY | |
| NORMAL APPLICATION | — | 4 | USER OPERATION | BASIC SOUND | OUTPUT IN SYNCHRONIZATION WITH DISPLAY | CALL SOUND MANAGEMENT (DSP CONTROL) |

FIG.6

SPLIT-SCREEN DISPLAY PROPERTIES

| NO SPLIT-SCREEN DISPLAY | NO DISPLAY REQUEST TO DISPLAY IMAGE OF NORMAL APPLICATION WITH PRIORITY HIGHER THAN PREDETERMINED LEVEL |  21a |
| --- | --- | --- |
| 2-SPLIT-SCREEN DISPLAY | TWO DISPLAY REQUESTS TO DISPLAY DIFFERENT IMAGES OF NORMAL APPLICATIONS WITH PRIORITY HIGHER THAN PREDETERMINED LEVEL |  21a |
| 3-SPLIT-SCREEN DISPLAY | THREE DISPLAY REQUESTS TO DISPLAY DIFFERENT IMAGES OF NORMAL APPLICATIONS WITH PRIORITY HIGHER THAN PREDETERMINED LEVEL | 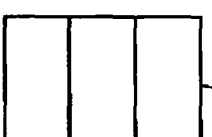 21a |

FIG.7

RESIZED-SCREEN DISPLAY PROPERTIES

| SCALE DISPLAY IMAGE FOR SUBSEQUENT REQUEST DOWN TO 50%, AND SUPERIMPOSE SCALED-DOWN IMAGE ON DISPLAY IMAGE FOR FIRST REQUEST |  21a |
| --- | --- |
| SCALE DISPLAY IMAGE FOR SUBSEQUENT REQUEST DOWN TO 25%, AND SUPERIMPOSE SCALED-DOWN IMAGE ON DISPLAY IMAGE FOR FIRST REQUEST |  21a |

FIG.8

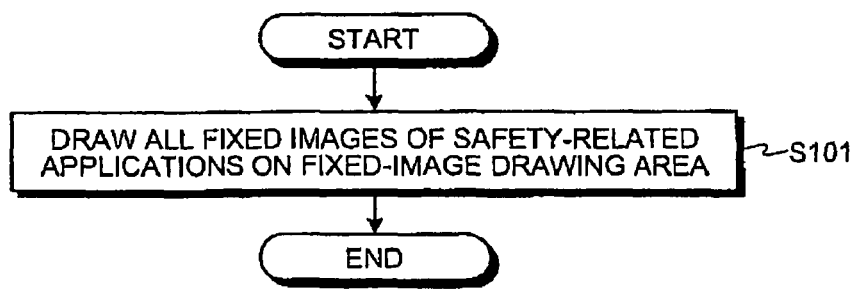

EXAMPLE OF IMAGE OF SAFETY-RELATED APPLICATION WITH HIGH LEVEL OF URGENCY

EXAMPLE OF IMAGE OF SAFETY-RELATED APPLICATION WITH MEDIUM LEVEL OF URGENCY

EXAMPLE OF IMAGE OF SAFETY-RELATED APPLICATION WITH LOW LEVEL OF URGENCY

FIG.15

DISPLAY-DEVICE SELECTING PROPERTIES

| TYPE OF APPLICATION | LEVEL OF URGENCY | DRIVER-SIDE DISPLAY DEVICE | CENTER DISPLAY DEVICE | FRONT-SEAT PASSENGER-SIDE DISPLAY DEVICE |
|---|---|---|---|---|
| SAFETY-RELATED APPLICATION | HIGH | DISPLAY | DISPLAY | NON-DISPLAY |
| | MEDIUM | DISPLAY | DISPLAY | NON-DISPLAY |
| | LOW | NON-DISPLAY | DISPLAY | NON-DISPLAY |
| NORMAL APPLICATION | - | DISPLAY | DISPLAY | DISPLAY | he present invention relates to an image display control
apparatus capable of controlling an image to be displayed on
a display device arranged in a vehicle, enabling a driver
and/or a passenger to watch the display device, by selecting
the image from a plurality of images requested to be displayed
by signals input from a plurality of in-vehicle units mounted
on the vehicle via an input unit based on display priorities
assigned to the images.

2. Description of the Related Art

Recently, a vehicle is commonly equipped with an image display device. Various in-vehicle units, for example, a navigation system, an audio system, and a sensor for checking a state or condition of the vehicle are connected to the image display device. Based on an input signal from any of the in-vehicle units, an operational status, a state or condition of the vehicle, or the like is displayed on a display screen of the image display device.

However, when a plurality of input signals from the in-vehicle units are input to the image display device at the same time, it is hard to display all images for the input signals on the display screen all together because a display area of the display screen has a limit. According to conventional technologies, when an image display device displays a first image thereon, if a request to display a second image is input to the image display device, the image display device eliminates the first image to display the second image, in most cases.

In this case, a display image is determined according to the latest display request. Therefore, the image display device displays the second image by switching from the first image even if the first image includes important information. In other words, even if the first image includes important information, and the second image includes less important information, the image display device displays the second image. Therefore, the important information may not get through to a driver and/or a passenger properly.

To solve the problems, for example, according to technologies disclosed in Japanese Patent Application Laid-open No. 2000-357300 and Japanese Patent Application Laid-open No. 2000-168474, images to be displayed on an image display device are ranked by a level of importance of information included in each of the images, and the image including information with a high level of importance is preferentially displayed on the image display device. Therefore, important information can get through to a driver and/or a passenger reliably.

Moreover, according to a technology disclosed in Japanese Patent Application Laid-open No. 2002-225592, when a vehicle is equipped with a plurality of image display devices, and a plurality of input signals from in-vehicle units are input at the same time, each of images for the input signals is controlled to be displayed on which of the image display devices depending on a level of importance of information included in each of the images. Therefore, the image including information with a high level of importance is preferentially displayed on the most appropriate image display device, so that the important information can get through to a driver and/or a passenger efficiently and effectively.

However, in such conventional technologies as disclosed in Japanese Patent Application Laid-open No. 2000-357300, Japanese Patent Application Laid-open No. 2000-168474, and Japanese Patent Application Laid-open No. 2002-225592, a display speed is constant because the same display process is always performed regardless of a level of importance of information included in an image. Therefore, when an image including information with urgency needs to be displayed, it takes a considerable time to display the image. As a result, the information with urgency cannot get through to the driver and/or the passenger immediately. In addition, even when an image withheld to be displayed due to its low level of importance is switched to be displayed, it takes a considerable time to display the image, so that a display timing of the image may be lost again.

SUMMARY OF THE INVENTION

It is an object of the present invention to at least partially solve the problems in the conventional technology.

According to an aspect of the present invention, there is provided an image display control apparatus that controls a display of an image on a display device based on a priority of the image from among a plurality of images requested to be displayed based on signals input from a plurality of in-vehicle units mounted on a vehicle via an input unit. The image display control apparatus includes an image-data loading unit that loads image data of an image requested to be displayed based on an input signal in an image memory; a display-image determining unit that determines an image to be displayed on the display device based on the priority after the image data is loaded in the image memory by the image-data loading unit; and an image-data output unit that reads out the image data of the image determined to be displayed by the display-image determining unit from the image memory, and outputs read image data to the display device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a table of an example of properties of images of a safety-related application and a normal application;

FIG. 3 is a table of an example of properties of the safety-related application shown in FIG. 2;

FIG. 4 is a table of an example of properties of the normal application shown in FIG. 2;

FIG. 5 is a table of an-example of synchronized-sound properties;

FIG. 6 is a table of an example of properties of a split-screen display;

FIG. 7 is a table of an example of properties of a screen-resized display;

FIG. 8 is a flowchart of a process performed by the image display control apparatus shown in FIG. 1 when a system starts up;

FIG. 15 is a table of an example of properties for selecting a display device;

DETAILED DESCRIPTION OF THE PREFERRED EMBODIMENTS

Figure 1:
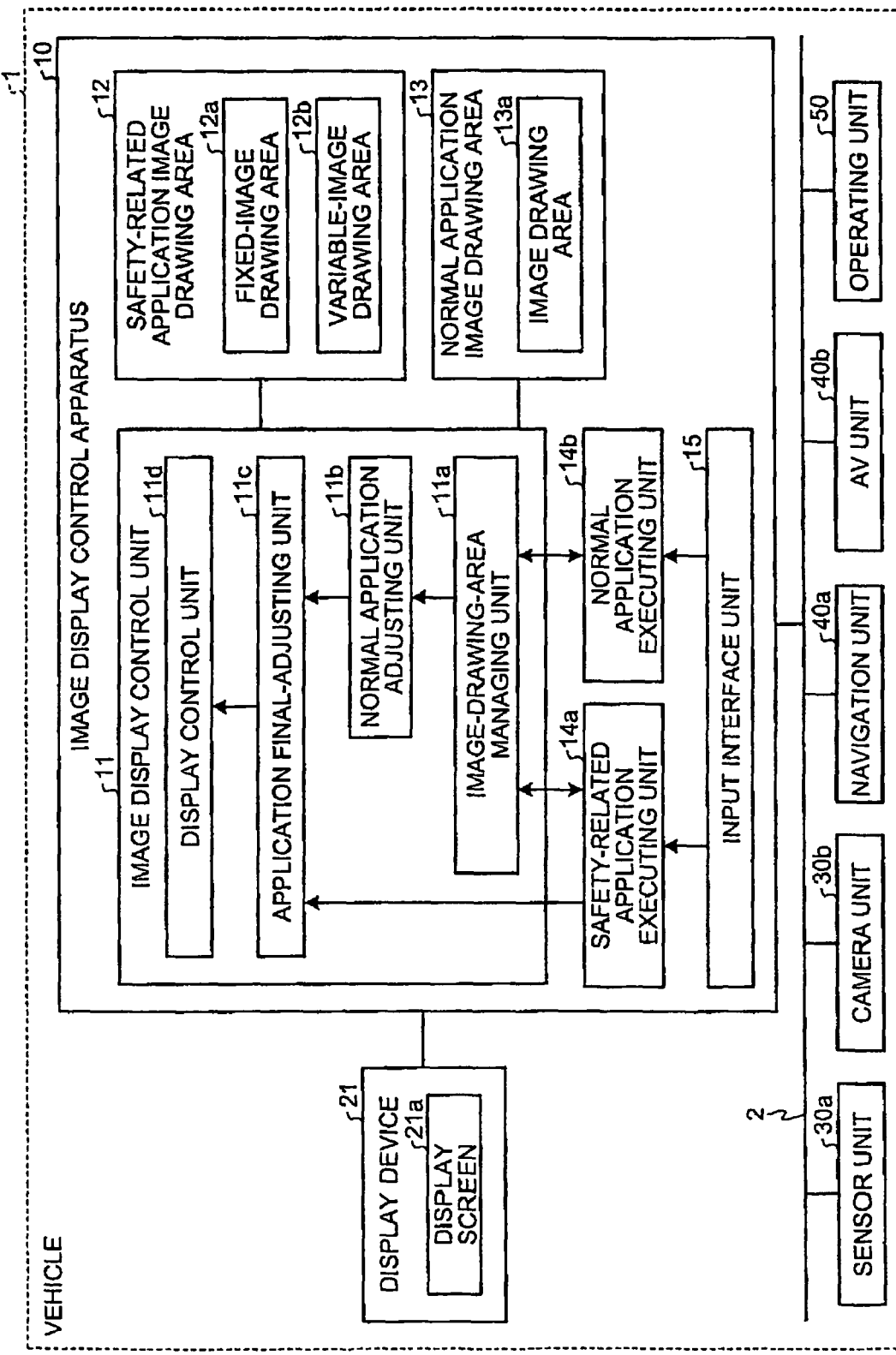
FIG. 1 is a block diagram of a vehicle including an image display control apparatus according to a first embodiment of the present invention.

Exemplary embodiments of the present invention are explained in detail below with reference to the accompanying drawings. An image display control apparatus according to the embodiments controls a display image of at least one image display device (hereinafter, "a display device") arranged in a vehicle, enabling a driver and/or a passenger to watch the display device. The image display control apparatus is a kind of a human machine interface (HMI) controller that determines an image to be displayed on the display device based on an input signal from any of electronics devices (for example, a sensor such as a speed sensor and a lighting device such as an indicator) mounted on the vehicle, and displays the determined image on the display device.

In a first embodiment of the present invention, it is assumed that one display device is connected to one image display control apparatus. When receiving a plurality of input signals from the electronics devices, the image display control apparatus selects an image to be displayed on the display device with adjusting images requested to be displayed by the input signals, and displays the selected image on the display device in a predetermined form. It is assumed that the display device is embedded in a center console of the vehicle, or arranged on an upper surface of the center console. It is assumed that the image display control apparatus is included in an enclosure together with the display device in an integrated manner, or the image display control apparatus and the display device are included in different enclosures respectively. It is assumed that the image display control apparatus is arranged in a predetermined position in the vehicle, for example, inside the center console.

With the above configuration, when receiving a plurality of signals from the electronics devices, the image display control apparatus needs to determine any of images for the signals to be displayed, and also determines how the determined image is to be displayed on the display device. Particularly, safety-related information in driving the vehicle needs to get through to a driver and/or a passenger immediately, otherwise the driver may cause a car accident. Therefore, it is necessary to get information through to the driver and/or the passenger in a way easy to recognize at a right timing depending on a level of importance of the information.

Consequently, in the embodiment, a storage area of a storing unit such as a video random access memory (VRAM) in which image data of an image to be displayed on a display screen of the display device is loaded is managed by each display image. The storage area is used as a virtual display area. In other words, a drawing area is separated from a display area. With an application for drawing image data of the storage area of the storing unit, image data of an image to be displayed on the display screen of the display device is drawn on the storage area as an individual virtual display area regardless of whether the image is displayed on the display screen. Whether the image is actually displayed on the display screen depends on a result of an adjustment by a display adjusting unit.

First, an in-vehicle network and the image display control apparatus according to the first embodiment are explained in detail below. FIG. 1 is a block diagram of a vehicle 1 including an image display control apparatus 10 according to the first embodiment. As shown in FIG. 1, a sensor unit 30a, a camera unit 30b, a navigation unit 40a, an audio-video (AV) unit 40b, and an operating unit 50 are connected to the image display control apparatus 10 via a controller area network (CAN) 2 as the in-vehicle network.

The image display control apparatus 10 includes an image display control unit 11, a safety-related application image drawing area 12, a normal application image drawing area 13, a safety-related application executing unit 14a, a normal application executing unit 14b, and an input interface unit 15. A display device 21 including a display screen 21a is connected to the image display control apparatus 10.

The image display control apparatus 10 receives an input signal from any of the sensor unit 30a, the camera unit 30b, the navigation unit 40a, the AV unit 40b, and the operating unit 50 via the input interface unit 15. The input interface unit 15 determines the input signal for displaying an image to be displayed on the display device 21 belongs in either a safety-related application or a normal application.

In this case, "safety-related" indicates information related to a danger warning in driving the vehicle 1. On the other hand, "normal" indicates information other than the "safety-related" information. Namely, "the safety-related application" is used to control an image related to danger warning information in driving the vehicle 1 to be displayed on the display device 21. On the other hand, "the normal application" is used to control an image related to information in driving the vehicle 1 other than the danger warning information to be displayed on the display device 21. Incidentally, an image of a safety-related application is categorized into a high, medium, or low level of urgency.

When the input interface unit 15 determines that an image of a safety-related application is to be displayed on the display device 21 based on the input signal, the safety-related application executing unit 14a executes the safety-related application.

The safety-related application executing unit 14a includes a storing unit (not shown) that stores therein executable codes for a plurality of safety-related applications. When the image display control apparatus 10 starts up, the safety-related application executing unit 14a reads out all the executable codes to activate the safety-related applications. When any of the safety-related applications is determined by the input interface unit 15, the safety-related application executing unit 14a executes the safety-related application.

Incidentally, the storing unit of the safety-related application executing unit 14a manages image data on images of the safety-related applications to be displayed on the display device 21 together with the executable codes in an associated manner.

An image of a safety-related application with a high level of urgency is a fixed image. An image of a safety-related application with a medium level of urgency is a variable image composed of a fixed image and a relatively short text message. An image of a safety-related application with a low level of urgency is a variable image composed of, for example, a shot image input from the camera unit 30b and a relatively long text message.

The storing unit of the safety-related application executing unit 14a stores therein the image data on images of safety-related applications to be displayed on the display device 21. In other words, a safety-related application can be easily stored in the storing unit additionally, so that a system expansion can be flexibly achieved.

Upon reading out all the executable codes to activate the safety-related applications at the start-up of the image display control apparatus 10, the safety-related application executing unit 14a preliminarily writes image data on fixed images of safety-related applications with high and medium levels of urgency on a fixed-image drawing area 12a after an image-drawing-area managing unit 11a acquires a resource (a storage area of the fixed-image drawing area 12a).

The image data of the fixed images of the safety-related applications is preliminarily loaded on the fixed-image drawing area 12a. Therefore, when any of the fixed images is actually displayed on the display device 21, the fixed image is already loaded on the fixed-image drawing area 12a, so that the fixed image can be quickly displayed on the display device 21. Consequently, the driver and/or the passenger of the vehicle 1, especially the driver can immediately recognize an image of a safety-related application with a high level of urgency when an image displayed on the display device 21 is switched to the image of the safety-related application.

When executing a safety-related application with an image of a medium or low level of urgency, the safety-related application executing unit 14a writes image data of a variable image of the image on a variable-image drawing area 12b after the image-drawing-area managing unit 11a acquires a resource (a storage area of the variable-image drawing area 12b).

Moreover, when executing a safety-related application, the safety-related application executing unit 14a outputs a display request of an image of the safety-related application together with an image identification (ID), an image layer, and an address in the safety-related application image drawing area 12 in which the image is drawn as arguments to an application final-adjusting unit 11c via an application program interface (API) (not shown).

When the input interface unit 15 determines that an image of a normal application is to be displayed on the display device 21 based on the input signal, the normal application executing unit 14b executes the normal application. The normal application executing unit 14b includes a storing unit (not shown) that stores therein executable codes for a plurality of normal applications. When executing a normal application, the normal application executing unit 14b reads out an executable code of the normal application to activate the normal application.

Incidentally, the storing unit of the normal application executing unit 14b manages image data on images of the normal applications to be displayed on the display device 21 together with the executable codes in an associated manner.

The storing unit of the normal application executing unit 14b stores therein image data on images of normal applications to be displayed on the display device 21. In other words, a normal application can be easily stored in the storing unit additionally, so that a system expansion can be flexibly achieved.

When executing a normal application, the normal application executing unit 14b writes image data of a variable image of the normal application on an image drawing area 13a of the normal application image drawing area 13 after the image-drawing-area managing unit 11a acquires a resource (a storage area of the image drawing area 13a).

Moreover, when executing a normal application, the normal application executing unit 14b outputs a display request of an image of the normal application together with an image ID, an image layer, and an address in the image drawing area 13a in which the image is drawn as arguments to a normal application adjusting unit 11b via the image-drawing-area managing unit 11a.

The image display control unit 11 includes the image-drawing-area managing unit 11a, the normal application adjusting unit 11b, the application final-adjusting unit 11c, and a display control unit 11d.

The image-drawing-area managing unit 11a acquires a resource corresponding to a resource acquiring request in which an image ID is specified, which is output from the safety-related application executing unit 14a or the normal application executing unit 14b, from any of the fixed-image drawing area 12a, the variable-image drawing area 12b, and the image drawing area 13a, and outputs a memory address of the acquired resource to the safety-related application executing unit 14a or the normal application executing unit 14b.

Upon receiving the resource, the safety-related application executing unit 14a or the normal application executing unit 14b draws a fixed image or a variable image of a safety-related application or a variable image of a normal application on an area corresponding to the memory address. Upon completion of the drawing, the image-drawing-area managing unit 11a outputs a completion notice of the drawing to the safety-related application executing unit 14a or the normal application executing unit 14b.

The normal application adjusting unit 11b adjusts display requests of images of normal applications enabling to be loaded on the image drawing area 13a. Such a display request of an image of a normal application is output from the normal application executing unit 14b to the normal application adjusting unit 11b via the image-drawing-area managing unit 11a.

The normal application adjusting unit 11b selects any of the images of the normal applications depending on predetermined display priorities, and determines to display the selected image of the normal application on the display device 21. Then, the normal application adjusting unit 11b outputs a display request of the image of the normal application determined to be displayed on the display device 21 to the application final-adjusting unit 11c.

The application final-adjusting unit 11c adjusts the display request of the image of the safety-related application to be executed by the safety-related application executing unit 14a and the display request of the image of the normal application determined to be displayed on the display device 21 by the normal application adjusting unit 11b, and controls the image of the safety-related application to be displayed on the display device 21 preferentially.

The application final-adjusting unit 11c reads out image data of the image of the application (either the safety-related application or the normal application) determined to be displayed on the display device 21 from the corresponding image drawing area based on an image ID, an image layer, and an address in the image drawing area in which the image is drawn (any of the fixed-image drawing area 12a, the variable-image drawing area 12b, and the image drawing area 13a), and outputs read image data to the display control unit 11d.

The display control unit 11d controls a display of the image on the display screen 21a of the display device 21 based on the image data received from the application final-adjusting unit 11c.

The safety-related application image drawing area 12 and the normal application image drawing area 13 are respectively an image-data loading unit that loads image data of an image to be displayed on the display device 21, such as a VRAM. The safety-related application image drawing area 12 includes the fixed-image drawing area 12a and the variable-image drawing area 12b. The fixed-image drawing area 12a is used to load image data of a fixed image of a safety-related application thereon. The variable-image drawing area 12b is used to load image data of a variable image of a safety-related application thereon.

The normal application image drawing area 13 includes the image drawing area 13a. The image drawing area 13a is used to load image data of a variable image of a normal application thereon.

The safety-related application image drawing area 12 and the normal application image drawing area 13 share a common storage area. A predetermined area of the common storage area is withheld for the fixed-image drawing area 12a by a threshold setting. The variable-image drawing area 12b and the image drawing area 13a share the rest of the common storage area, and thereby saving a capacity of the image-data loading unit.

The display device 21 displays a predetermined image on the display screen 21a based on a signal output from the display control unit 11d.

The sensor unit 30a is under the control of an electric control unit (ECU) (not shown) for controlling in-vehicle electronics devices or an engine control unit (not shown) for controlling an engine electronically. The sensor unit 30a includes a speed sensor, an ambient temperature sensor, an engine temperature sensor, a battery voltage sensor, and the like. The sensor unit 30a outputs a sensor signal.

The camera unit 30b is attached to outside the vehicle 1, and shoots an image surrounding the vehicle 1. The camera unit 30b outputs a shot-image signal. The navigation unit 40a is so-called a car navigation system, and outputs an image signal for map information, route guidance information, road information, or the like.

The AV unit 40b is a system that an audio system and a television (TV) system are integrated thereinto. The AV unit 40b plays back a music content and outputs a playback signal for the music content, and also receives a TV content and outputs a receive signal of the TV content.

The operating unit 50 includes operation screens and operating switches. Each of the operation screens is displayed on the display device 21 to operate the AV unit 40b or the like. The operating switches are used to operate the in-vehicle electronics devices such as an air conditioner.

The sensor unit 30a, the camera unit 30b, the navigation unit 40a, the AV unit 40b, and the operating unit 50 are connected to the image display control apparatus 10 via the CAN 2, and respectively establish an interactive communication with the image display control apparatus 10.

Subsequently, properties of images of applications controlled to be displayed by the image display control apparatus 10 are explained below with reference to FIG. 2. FIG. 2 is a table of an example of the properties. A type of an application executed by the safety-related application executing unit 14a is a "safety-related application", and a type of an application executed by the normal application executing unit 14b is a "normal application".

The safety-related application is categorized into any of high, medium, and low levels of urgency. Images of safety-related applications with the high, medium, and low levels of urgency are assigned with high display priorities to be displayed on the display device 21 in this order. A display priority assigned to an image of a normal application is lower than the display priorities of the safety-related applications.

An image drawing area used for an image of a safety-related application with a high level of urgency is the fixed-image drawing area 12a. A display content of the image of the safety-related application with the high level of urgency is a "red warning sign" and a "fixed message" that are fixed images. A timing to draw the image of the safety-related application with the high level of urgency is when a system of the image display control apparatus 10 starts up.

An image drawing area used for an image of a safety-related application with a medium level of urgency is the fixed-image drawing area 12a and the variable-image drawing area 12b. A display content of the image of the safety-related application with the medium level of urgency is a "yellow warning sign" that is a fixed image and a "variable message" that is a variable image. The "variable message" is read in the variable-image drawing area 12b every time a display request of the image is input, and is a customizable message with a relatively small amount of information. A timing to draw the fixed image is when the system of the image display control apparatus 10 starts up, and a timing to draw the variable image is when an event occurs, i.e., when the safety-related application executing unit 14a executes the safety-related application with the medium level of urgency.

An image drawing area used for an image of a safety-related application with a low level of urgency is the variable-image drawing area 12b. A display content of the image of the safety-related application with the low level of urgency is a "variable message" and a "camera-shot image" that are variable images. The "variable message" is read in the variable-image drawing area 12b every time a display request of the image is input, and is a customizable message with a relatively large amount of information. A timing to draw the variable images is when an event occurs, i.e., when the safety-related application executing unit 14a executes the safety-related application with the low level of urgency.

An image drawing area used for an image of a normal application is the image drawing area 13a. A display content of the image of the normal application is a "message output by the normal application" that is a variable image. A timing to draw the variable image is when an event occurs, i.e., when the normal application executing unit 14b executes the normal application.

Subsequently, an example of concrete display contents of images of safety-related applications is explained below with reference to FIG. 3. FIG. 3 is a table of an example of safety-related application properties indicating concrete display contents of images of the safety-related applications shown in FIG. 2. It is assumed that the properties are preliminarily stored in a storing unit (not shown) included in the application final-adjusting unit 11c.

A display content of an image of a safety-related application with a high level of urgency is, for example, a warning of a crash, a notice of a dangerous object around the vehicle 1, or the like. Such an image is displayed based on all information from the camera unit 30b and the sensor unit 30a (for example, the speed sensor (not shown), a sonar sensor (not shown), a radar sensor (not shown), or a millimeter-wave sensor (not shown) included in the sensor unit 30*a*). The image of the safety-related application with the high level of urgency needs to be displayed on the display device 21 as the highest priority because an immediate danger in driving the vehicle 1 is predicted.

A display content of an image of a safety-related application with a medium level of urgency is, for example, a warning of sudden braking, a warning of speeding, or the like. Such an image is displayed based on information from, for example, the speed sensor (not shown) or a brake hydraulic sensor (not shown) included in the sensor unit 30*a*. The image of the safety-related application with the medium level of urgency needs to be displayed on the display device 21 as the second-highest priority, i.e., the highest priority next to that of the image of the safety-related application with the high level of urgency because a relatively immediate danger in safe driving the vehicle 1 is predicted.

A display content of an image of a safety-related application with a low level of urgency is, for example, a watch on an obstacle ahead, a watch on an obstacle behind when the driver backs, a watch on an obstacle when the driver turns left or right, a watch on an obstacle around, or the like. Such an image is displayed based on information from, for example, the camera unit 30*b* or the sonar sensor (not shown) included in the sensor unit 30*a*. The image of the safety-related application with the low level of urgency needs to be displayed on the display device 21 as the third-highest priority, i.e., the highest priority next to that of the image of the safety-related application with the medium level of urgency because there is a danger in safe driving the vehicle 1 may occur depending on circumstances.

Subsequently, an example of concrete display contents of images of normal applications is explained below with reference to FIG. 4. FIG. 4 is a table of an example of normal application properties indicating concrete display contents of images of normal applications shown in FIG. 2. It is assumed that the properties are preliminarily stored in a storing unit (not shown) included in the normal application adjusting unit 11*b*.

As display contents of images of normal applications, there are a guidance by the navigation unit 40*a*, a destination setting to be input to the navigation unit 40*a*, traffic information from the navigation unit 40*a*, an operation screen of the navigation unit 40*a*, an operation screen of the air conditioner, an operation screen of the audio system, an operation screen of the video system, and the like. Based on levels of importance of information included in the display contents, it is assumed that the first display priority is assigned to the guidance by the navigation unit 40*a*, the second display priority is assigned to the destination setting to be input to the navigation unit 40*a*, the third display priority is assigned to the traffic information from the navigation unit 40*a*, the fourth display priority is assigned to the operation screen of the navigation unit 40*a*, and the fifth display priority is assigned to the operation screens of any of the air conditioner, the audio system, and the video system. Therefore, an image having a display content with a higher display priority is preferentially displayed on the display device 21. If there are a plurality of images having a display content with a display priority higher than a predetermined level, the images are displayed all together by a split-screen display method.

The images displayed by the use of the safety-related application and the normal application are explained above. It is also possible to output a sound in synchronization with each of the images. FIG. 5 is a table of an example of synchronized-sound properties indicating properties of sounds to be output in synchronization with each of the images of the safety-related application and the normal application.

Each of the sounds is output from a speaker (not shown) at a predetermined timing when a sound-output processing unit (not shown) performs a predetermined process. Sound data on each of the sounds is managed by the safety-related application executing unit 14*a* or the normal application executing unit 14*b* to be associated with the image data.

It is assumed that a sound to be output in synchronization with an image of a safety-related application with a high level of urgency is assigned with the first priority for the sound output, and a start trigger of the sound is, for example, an event in the vehicle 1, i.e., to be synchronized with a timing on when the image is displayed. A type of the sound is, for example, a beep sound. An output timing of the sound is to be synchronized with the timing on when the image is displayed. Such a beep sound is output by calling a beep-sound control process.

It is assumed that a sound to be output in synchronization with an image of a safety-related application with a medium level of urgency is assigned with the second priority for the sound output, and a start trigger of the sound is, for example, an event in the vehicle 1, i.e., to be synchronized with a timing on when the image is displayed. A type of the sound is, for example, an interrupt sound. An output timing of the sound is to be synchronized with the timing on when the image is displayed after a display adjustment by the application final-adjusting unit 11*c*. A start pointer of sound data on the interrupt sound is registered in an interrupt sound management. When the start pointer is specified, the sound data is read out to output the interrupt sound.

It is assumed that a sound to be output in synchronization with an image of a safety-related application with a low level of urgency is assigned with the third priority for the sound output, and a start trigger of the sound is, for example, an event in the vehicle 1, i.e., to be synchronized with a timing on when the image is displayed. A type of the sound is, for example, an interrupt sound. An output timing of the sound is to be synchronized with the timing on when the image is displayed after a display adjustment by the application final-adjusting unit 11*c*. A start pointer of sound data on the interrupt sound is registered in the interrupt sound management. When the start pointer is specified, the sound data is read out to output the interrupt sound.

There are two types of sounds to be output in synchronization with an image of a normal application. It is assumed that one type of the sound is assigned with the fourth priority for the sound output, and a start trigger of the sound is an event in the vehicle 1. The type of the sound is, for example, an interrupt sound. An output timing of the sound is to be synchronized with the timing on when the image is displayed after a display adjustment by the application final-adjusting unit 11*c*. A start pointer of sound data on the interrupt sound is registered in the interrupt sound management. When the start pointer is specified, the sound data is read out to output the interrupt sound.

It is assumed that a start trigger of the other type of the sound to be output in synchronization with an image of a normal application is, for example, a user operation. The other type of the sound is, for example, a basic sound. An output timing of the sound is to be synchronized with the timing on when the image is displayed. The basic sound is output by calling a sound management (a digital signal processor (DSP) control).

Subsequently, an example of a split-screen display on the display screen 21*a* by the display control unit 11*d* is explained below. FIG. 6 is a table of an example of split-screen display properties for the split-screen display on the display screen 21a.

When a plurality of images of normal applications with the same display priority are requested to be displayed, the display screen 21a is split so that the images can be displayed on the display screen 21a all together. When only one image of a normal application is requested to be displayed, the image is displayed in a full-screen display without splitting the display screen 21a.

When two images of normal applications with the same display priority are requested to be displayed, and the display priority is higher than a predetermined level, the display screen 21a is split into-two split screens so that the two images can be displayed in a 2-split-screen display. In the same manner as the 2-split-screen display, when three images of normal applications with the same display priority are requested to be displayed, and the display priority is higher than the predetermined level, the display screen 21a is split into three split screens so that the three images can be displayed in a 3-split-screen display.

Such a split-screen display is applicable to only an image of a normal application without urgency. An image of a safety-related application with a high level of urgency is preferentially displayed, so that the split-screen display is not applicable to the image of the safety-related application. When a plurality of images of safety-related applications with the same level of urgency are requested to be displayed, the image requested to be displayed last is displayed. This is because only one image of a safety-related application is to be displayed in the full-screen display with due consideration for urgency of a situation, so that the driver and/or the passenger can reliably recognize information with a high level of urgency.

Subsequently, an example of a screen-resized display on the display screen 21a by the display control unit 11d is explained below. FIG. 7 is a table of an example of properties of the screen-resized display on the display screen 21a.

When a plurality of images of normal applications with the display priority higher than the predetermined level are requested to be displayed, the image requested to be displayed last can be scaled down so that the images can be displayed on the display screen 21a all together. As shown in FIG. 7, when two images of normal applications with the display priority higher than the predetermined level are requested to be displayed, the image requested to be displayed secondly is scaled down to 50% in size, and superimposed on the image requested to be displayed first.

Instead of scaling the image down to 50% in size, the image requested to be displayed secondly can be scaled down to 25% in size, and superimposed on the image requested to be displayed first. The percentage of scaling is defined in each of normal applications. Instead of the split-screen display, the screen-resized display can be used to display a plurality of images of normal applications with the display priority higher than the predetermined level all together.

When a display priority of one of, for example, two images of normal applications requested to be displayed is higher than the predetermined level, and that of the other image is lower than the predetermined level, even though the image requested to be displayed secondly is assigned with the higher display priority than that of the image requested to be displayed first, the image requested to be displayed secondly is scaled down depending on types of the images. In other words, regardless of the display priorities of the images, the image requested to be displayed secondly is scaled down to be superimposed on the image requested to be displayed first so that the driver and/or the passenger can recognize the image requested to be displayed first. When the image requested to be displayed secondly is based on an interrupt request, the driver and/or the passenger can easily scale the image up to an original size.

Subsequently, a process performed by the image display control apparatus 10 at the time of system start-up is explained below with reference to a flowchart shown in FIG. 8. At the time of the system start-up, the safety-related application executing unit 14a draws all fixed images of safety-related applications on the fixed-image drawing area 12a via the image-drawing-area managing unit 11a (Step S101).

An execution timing of the process is not limited to at the system start-up. Alternatively, the process can be performed at a different timing, for example, at a start-up time of an engine or when start driving the vehicle 1.

Figure 9:
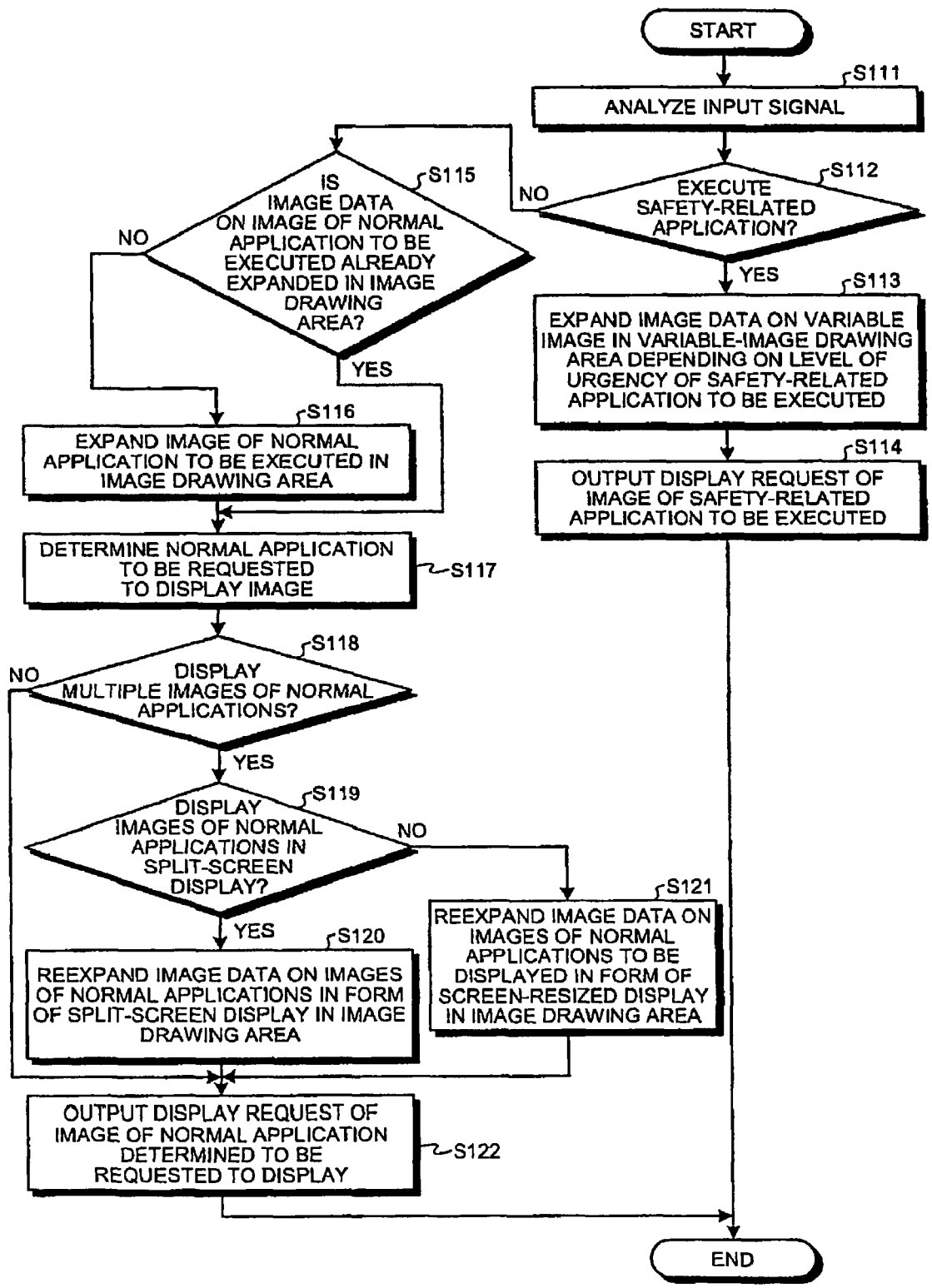
FIG. 9 is a flowchart of an image-display-request outputting process performed by the image display control apparatus shown in FIG. 1.

Subsequently, an image-display-request outputting process performed by the image display control apparatus 10 is explained below with reference to a flowchart shown in FIG. 9. First, the input interface unit 15 analyzes an input signal (Step S111). Based on a result of the analysis, the input interface unit 15 determines whether a safety-related application is to be executed (Step S112).

When the input interface unit 15 determines that a safety-related application is to be executed (YES at Step S112), the safety-related application executing unit 14a draws image data of a variable image of the safety-related application on the variable-image drawing area 12b depending on a level of importance (urgency) of the safety-related application (Step S113), and outputs a display request of an image of the safety-related application to the application final-adjusting unit 11c directly (Step S114).

When the input interface unit 15 determines that a safety-related application is not executed (NO at Step S112), i.e., determines that a normal application is to be executed, the input interface unit 15 further determines whether image data of an image of the normal application to be executed is already drawn on the image drawing area 13a (Step S115).

When the input interface unit 15 determines that the image data of the image of the normal application to be executed is already drawn on the image drawing area 13a (YES at Step S115), the process control goes to Step S117. When the input interface unit 15 determines that the image data of the image of the normal application to be executed is not drawn on the image drawing area 13a (NO at Step S115), the normal application executing unit 14b draws the image of the normal application on the image drawing area 13a (Step S116).

At Step S117, the normal application adjusting unit 11b determines whether a display request of the image of the normal application is to be output. When the normal application adjusting unit 11b determines to withhold the display request of the image of the normal application, the display request of the image of the normal application is registered in a waiting list. If a screen becomes non-active while the display request is on the waiting, the display request is deleted from the waiting list. Subsequently, the normal application adjusting unit 11b determines whether a plurality of images of normal applications are to be displayed all together (Step S118). When the normal application adjusting unit 11b determines that a plurality of images of normal applications are to be displayed all together (YES at Step S118), the process control goes to Step S119. When the normal application adjusting unit 11b determines that a plurality of images of normal applications are not displayed all together (NO at Step S118), the process control goes to Step S122.

At Step S119, the normal application adjusting unit 11b further determines whether the images of the normal applications are to be displayed in a split-screen display. When the normal application adjusting unit 11b determines that the images of the normal applications are to be displayed in the split-screen display (YES at Step S119), the process control goes to Step S120. When the normal application adjusting unit 11b determines that the images of the normal applications are not displayed in the split-screen display (NO at Step 5119), the process control goes to Step S121.

At Step S120, the normal application adjusting unit 11b requests the image-drawing-area managing unit 11a to redraw image data on images of the normal applications in a form of the split-screen display. Upon receiving the request, the image-drawing-area managing unit 11a reloads image data of the images of the normal applications received from the normal application executing unit 14b in the form of the split-screen display.

At Step S121, the normal application adjusting unit 11b requests the image-drawing-area managing unit 11a to redraw image data on images of the normal applications to be displayed in a form of the screen-resized display. Upon receiving the request, the image-drawing-area managing unit 11a reloads image data of the images of the normal applications received from the normal application executing unit 14b in the form of the screen-resized display.

The normal application adjusting unit 11b outputs a display request of the image of the normal application determined to be displayed to the application final-adjusting unit 11c (Step S122).

Figure 10:
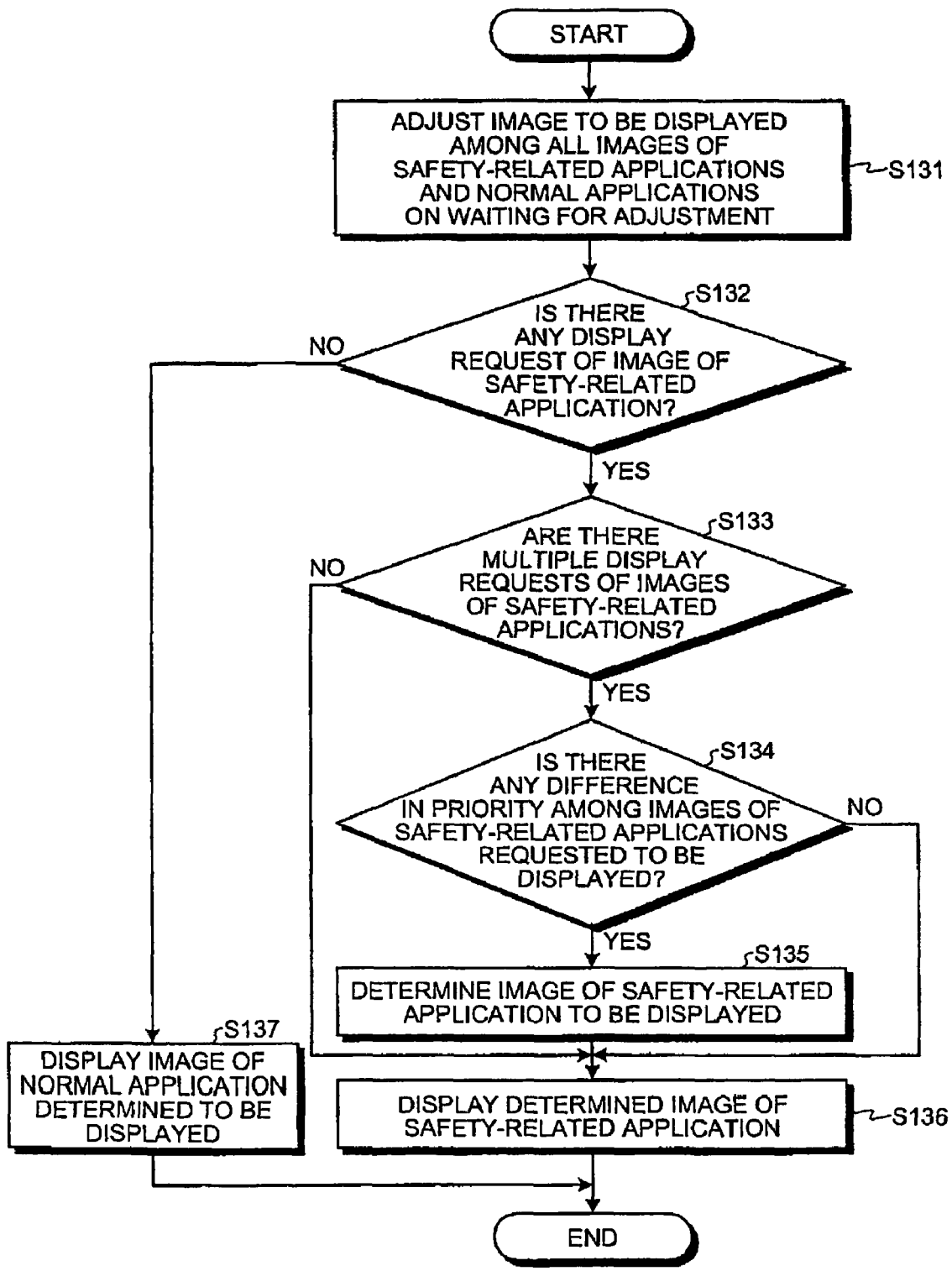
FIG. 10 is a flowchart of an image display process performed by the image display control apparatus shown in FIG. 1.

Subsequently, an image display process performed by the image display control apparatus 10 shown in FIG. 1 is explained below with reference to a flowchart shown in FIG. 10. The image display process is performed periodically, for example, in a period of 30 milliseconds. First, the application final-adjusting unit 11c adjusts an image to be displayed among all images of safety-related applications and normal applications on the waiting for adjustment (Step S131). A display request of an image of a normal application determined to be withheld is registered in the waiting list. However, if a screen becomes non-active while the display request is on the waiting, the display request is deleted from the waiting list.

Subsequently, the application final-adjusting unit 11c determines whether there is any display request of an image of a safety-related application (Step S132). If there is a display request of an image of a safety-related application (YES at Step S132), the process control goes to Step S133. If there is no display request of an image of a safety-related application (NO at Step S132), the image of the normal application determined to be displayed is displayed (Step S137).

By this stage at Step S137, the normal application adjusting unit 11b has finished an adjustment of display priorities of the normal applications, and also whether a form of the split-screen display or a form of the screen-resized display has been determined based on the adjustment by the normal application adjusting unit 11b if a plurality of images of normal applications are to be displayed all together. Therefore, what to be done at Step S137 is just that the image is displayed based on the determination by the normal application adjusting unit 11b.

At Step S133, the application final-adjusting unit 11c determines whether there are a plurality of display requests of images of safety-related applications. When the application final-adjusting unit 11c determines that there are a plurality of display requests of images of safety-related applications (YES at Step S133), the process control goes to Step S134.

When there is only one display request of an image of a safety-related application (NO at Step S133), the process control goes to Step S136.

At Step S134, the application final-adjusting unit 11c further determines whether there is any difference in display priority among the images of the safety-related applications. When there is a difference in display priority among the images of the safety-related applications (YES at Step S134), the process control goes to Step S135. When there is no difference in display priority among the images of the safety-related applications (No at Step S134), the process control goes to Step S136.

At Step S135, the application final-adjusting unit 11c determines any of the images of the safety-related applications to be displayed based on the display priorities assigned to the images of the safety-related applications. Then, the application final-adjusting unit 11c instructs the display control unit 11d to display the image of the safety-related application determined to be displayed on the display device 21.

Figure 11A:
FIG. 11A is a schematic diagram of an example of an image of a safety-related application with a high level of urgency.

Subsequently, an example of an image of a safety-related application is explained below with reference to FIGS. 11A to 11C. FIG. 11A is a schematic diagram of an example of an image of a safety-related application with a high level of urgency. The image shown in FIG. 11A includes a red warning sign 51a and a fixed message 51b that are fixed images.

Figure 11B:
FIG. 11B is a schematic diagram of an example of an image of a safety-related application with a medium level of urgency.

FIG. 11B is a schematic diagram of an example of an image of a safety-related application with a medium level of urgency. The image shown in FIG. 11B includes a yellow warning sign 52a that is a fixed image and a variable message 52b that is a variable image.

Figure 11C:
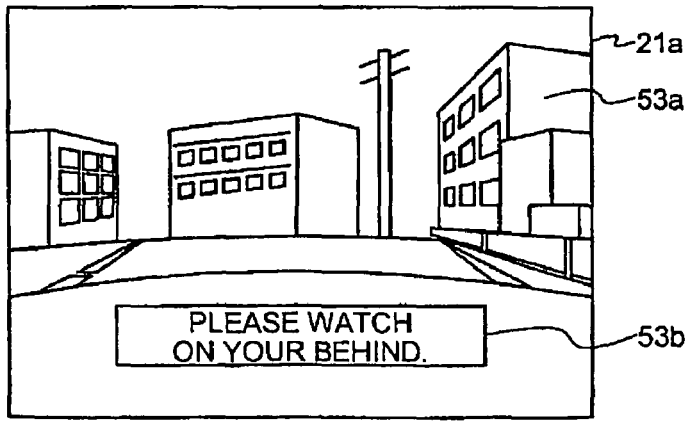
FIG. 11C is a schematic diagram of an example of an image of a safety-related application with a low level of urgency.

FIG. 11C is a schematic diagram of an example of an image of a safety-related application with a low level of urgency. The image shown in FIG. 11C includes a camera-shot image 53a and a variable message 53b that are variable images.

Figure 12:
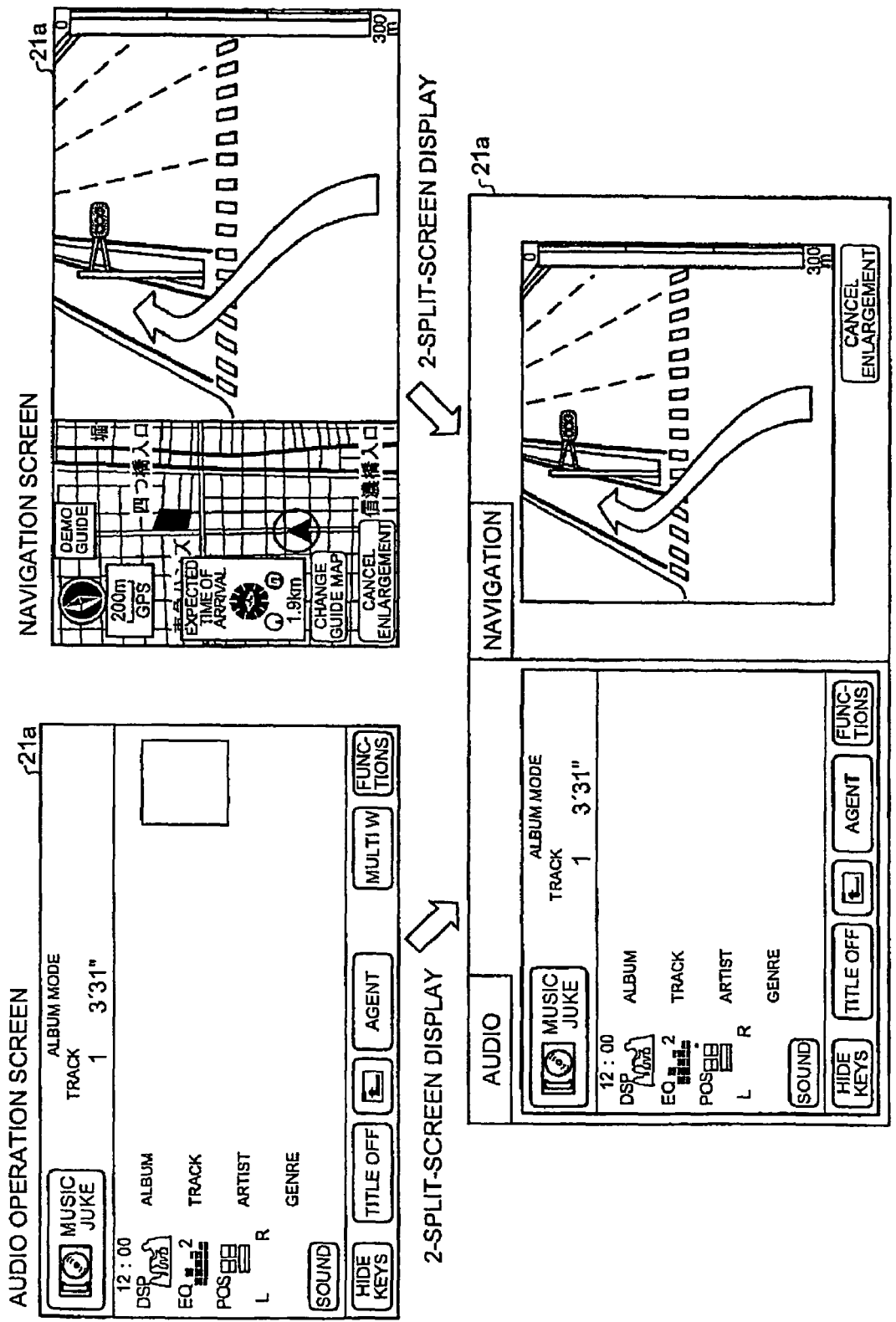
FIG. 12 is a schematic diagram of a concrete example of the split-screen display.

Subsequently, a concrete example of images of normal applications in a form of the split-screen display, as explained above with reference to FIG. 6, is explained below with reference to FIG. 12. In this case, the display screen 21a is split into two split screens so that an audio operation screen and a navigation screen can be displayed on the display screen 21a all together. Specifically, image data of an image of the audio operation screen in a full-screen display and image data of an image of the navigation screen in a full-screen display are respectively redrawn on the image drawing area 13a to meet the form of the split-screen display. The display control unit 11d synthesizes two sets of the redrawn image data of the images of the audio operation screen and the navigation screen to display the images on the display screen 21a all together in the 2-split-screen display.

To put priority on ensuring of the readability of each of the images in the 2-split-screen display, an important piece of information can be extracted from the image data on each of the redrawn images, and displayed on the display screen 21a in the 2-split-screen display. The display screen 21a can be split into three or more split screens in the same manner as the 2-split-screen display.

Figure 13:
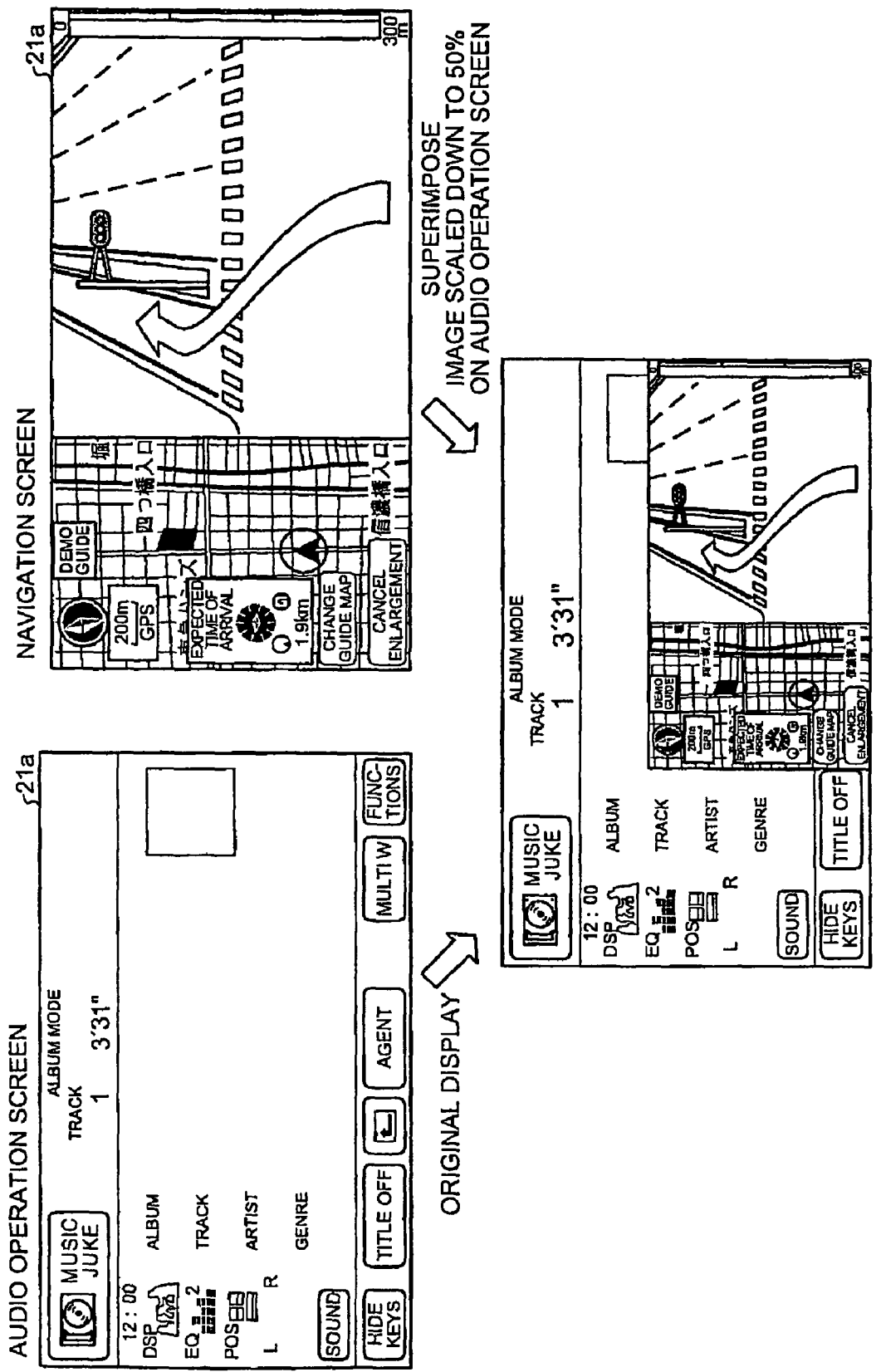
FIG. 13 is a schematic diagram of a concrete example of the screen-resized display.

Subsequently, a concrete example of images of normal applications in a form of the screen-resized display, as explained above with reference to FIG. 7, is explained below with reference to FIG. 13. In this case, an image of the navigation screen, which is requested to be displayed secondly, is scaled down to 50% in size, and the scaled-down image of the navigation screen is superimposed on an image of the audio operation screen in a full-screen display, which is requested to be displayed first. Specifically, image data of the image of the navigation screen is redrawn on the image drawing area 13a to meet the form of the screen-resized display of 50% scaling down. The display control unit 11d synthesizes the redrawn image data of the image of the navigation screen and the image data of the image of the audio operation screen in such a manner that the image of the navigation screen scaled down to 50% in size is superimposed on the image of the audio operation screen in the full-screen display.

To put priority on ensuring of the readability of the image in the screen-resized display, an important piece of information can be extracted from the image data of the image in the screen-resized display, and only the extracted information can be displayed on the display screen 21a in the screen-resized display. The display screen 21a can be resized by any percentage of scaling in the same manner as the 50% scaling down.

In a second embodiment of the present invention, it is assumed that three display devices are connected to one image display control apparatus. When receiving a plurality of input signals from the electronics devices, the image display control apparatus selects at least one image to be displayed on the display devices by adjusting images requested to be displayed by the input signals, and displays the selected image on the display devices in a predetermined form. Incidentally, the number of the display devices is not limited to three. The second embodiment can be applied to a case in which a plurality of display devices are connected to the image display control apparatus. Only the portions different from those for the first embodiment are explained below.

In the second embodiment, the display device arranged in a position where a driver can watch the display device is referred to as a driver-side display device, the display device embedded in the center console or arranged on the center of the upper surface of the center console is referred to as a center display device, and the display device arranged in a position where a front-seat passenger can watch the display device is referred to as a front-seat passenger-side display device. The display devices employ a typical liquid crystal display (LCD) or a code ray tube (CRT) display as a display screen. Alternatively, a head up display (HUD) can be used as the display screen.

Furthermore, the display devices are not limited to the driver-side display device, the center display device, and the front-seat passenger-side display device. The display device can be arranged in a position where a rear-seat passenger can watch the display device to be used as a rear seat entertainment (RSE).

Figure 14:
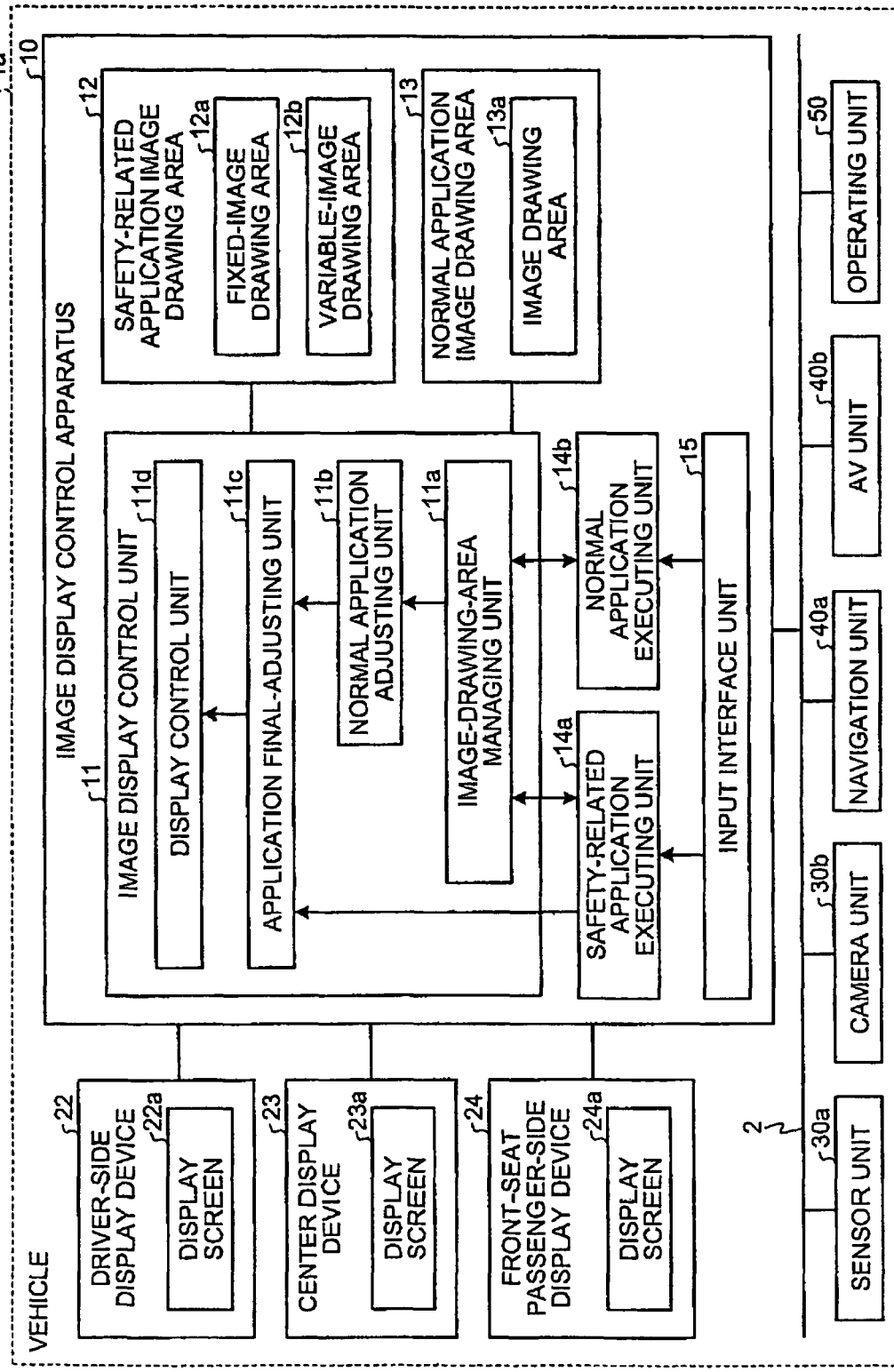
FIG. 14 is a block diagram of a vehicle including an image display control apparatus according to a second embodiment of the present invention.

FIG. 14 is a block diagram of a vehicle 1a including the image display control apparatus 10 according to the second embodiment. The portions identical to those in FIG. 1 for the first embodiment are denoted with the same reference numerals, and the description of those portions is omitted.

In the second embodiment, instead of the display device 21, a driver-side display device 22 including a display screen 22a, a center display device 23 including a display screen 23a, and a front-seat passenger-side display device 24 including a display screen 24a are connected to the image display control apparatus 10. The display control unit 11d determines which image is to be displayed on which of the display devices 22 to 24.

Subsequently, properties indicating criteria for selecting the display device on which an image is displayed are explained. FIG. 15 is a table of an example of a display-device selecting properties. It is assumed that the properties are preliminarily stored in a storing unit (not shown) included in the display control unit 11d.

An image of a safety-related application with a high level of urgency is displayed on the driver-side display device 22 and the center display device 23, but not displayed on the front-seat passenger-side display device 24.

An image of a safety-related application with a medium level of urgency is displayed on the driver-side display device 22 and the center display device 23, but not displayed on the front-seat passenger-side display device 24. An image of a safety-related application with a low level of urgency is displayed on the driver-side display device 22, but not displayed on the center display device 23 and the front-seat passenger-side display device 24.

An image of a normal application is displayed on all of the driver-side display device 22, the center display device 23, and the front-seat passenger-side display device 24.

In this manner, an image is displayed on any of the display devices depending on a level of importance of information of the image. Therefore, the information can get through to the driver and/or the passenger more efficiently and effectively.

Figure 16:
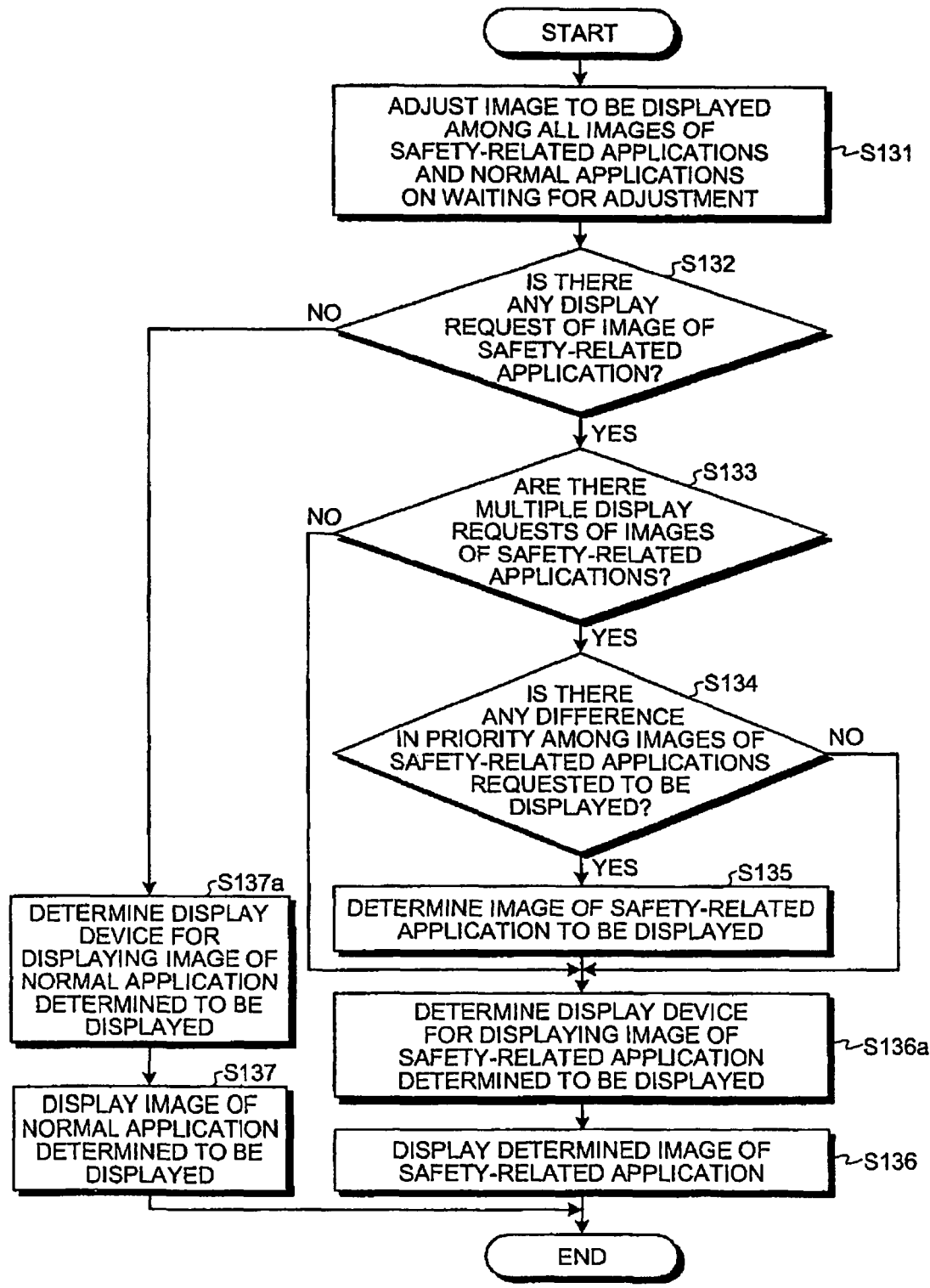
FIG. 16 is a flowchart of an image display process performed by the image display control apparatus shown in FIG. 14.

Subsequently, an image display process performed by the image display control apparatus 10 shown in FIG. 14 is explained below with reference to a flowchart shown in FIG. 16. The portions other than Steps S136a and S137a are identical to those in FIG. 10 for the first embodiment, so that the description of those portions is omitted.

When there is only one display request of an image of a safety-related application (NO at Step S133), or when there is no difference in display priority among images of safety-related applications requested to be displayed (NO at Step S134), or after the application final adjusting unit 11c determines any of the images of the safety-related applications to be displayed (Step S135), the display control unit 11d determines any of the display devices for displaying the image of the safety-related application determined to be displayed based on the properties shown in FIG. 15 (Step S136a), and the process control goes to Step S136.

If there is no display request of an image of a safety-related application (No at Step S132), the display control unit 11d determines any of the display devices for displaying the image of the normal application determined to be displayed based on the properties shown in FIG. 15 (Step S137a), and the process control goes to Step S137.

An image display control apparatus according to a third embodiment of the present invention has a redundant configuration.

Figure 17:
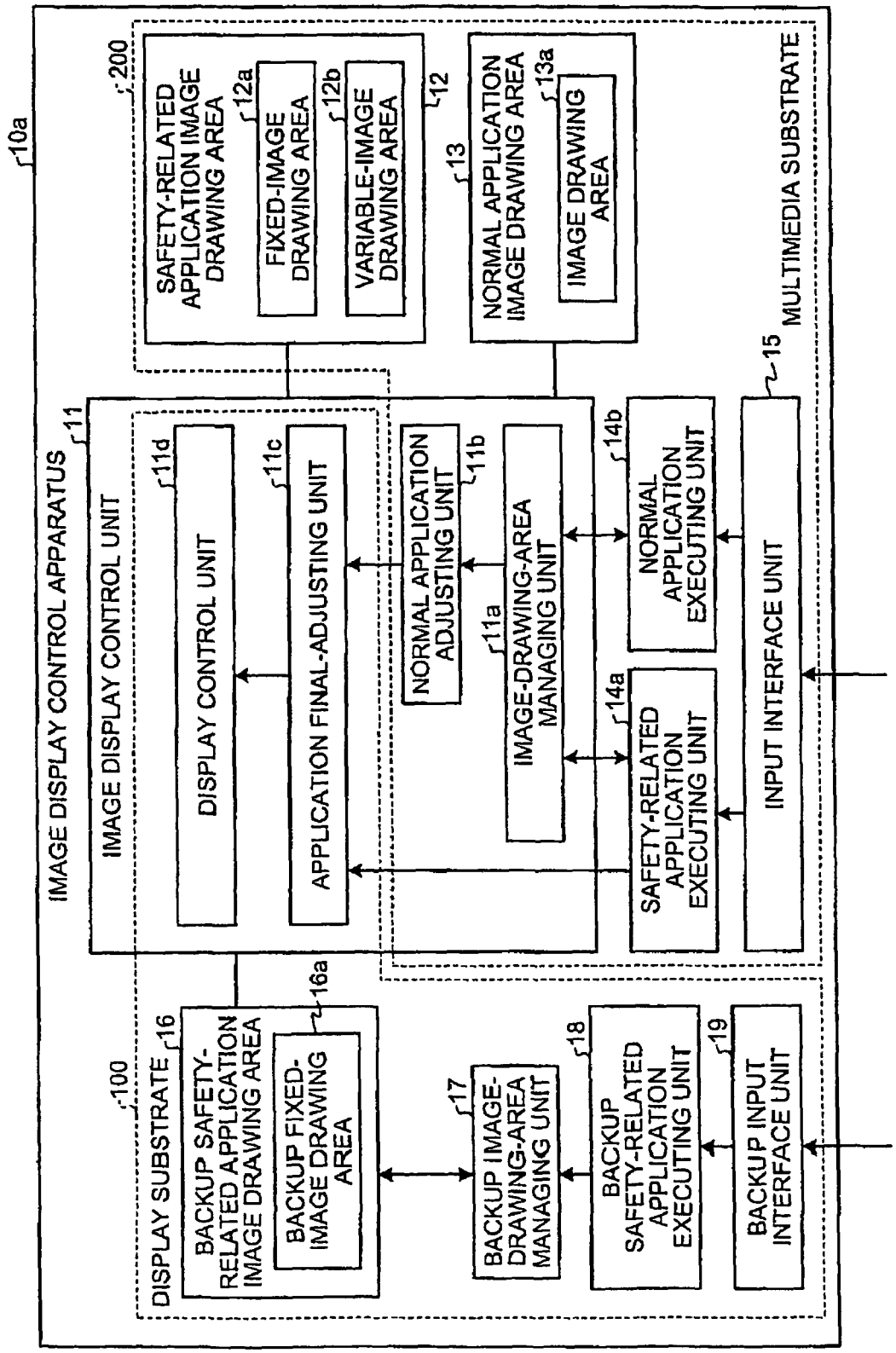
FIG. 17 is a block diagram of an image display control apparatus according to a third embodiment of the present invention.

FIG. 17 is a block diagram of an image display control apparatus 10a according to the third embodiment of the present invention. The portions identical to those in FIG. 1 for the first embodiment are denoted with the same reference numerals, and the description of those portions is omitted. A difference between the image display control apparatuses 10 and 10a is that the image display control apparatus 10a further includes a backup safety-related application image drawing area 16, a backup image-drawing-area managing unit 17, a backup safety-related application executing unit 18, and a backup input interface unit 19.

The backup safety-related application image drawing area 16 is a backup area of the safety-related application image drawing area 12. The backup safety-related application image drawing area 16 includes a backup fixed-image drawing area 16a. In other words, the backup fixed-image drawing area 16a is a backup area of the fixed-image drawing area 12a.

The backup image-drawing-area managing unit 17 serves as a backup of the image-drawing-area managing unit 11a. The backup safety-related application executing unit 18 serves as a backup of the safety-related application executing unit 14a. The backup input interface unit 19 serves as a backup of the input interface unit 15.

As shown in FIG. 17, the backup safety-related application image drawing area 16, the backup image-drawing-area managing unit 17, the backup safety-related application executing unit 18, the backup input interface unit 19, the application final-adjusting unit 11c, and the display control unit 11d are mounted on a display substrate 100. The image-drawing-area managing unit 11a, the normal application adjusting unit 11b, the safety-related application image drawing area 12, the normal application image drawing area 13, the safety-related application executing unit 14a, the normal application executing unit 14b, and the input interface unit 15 are mounted on a multimedia substrate 200.

For example, the backup safety-related application executing unit 18 mounted on the display substrate 100 monitors a status of the safety-related application executing unit 14a mounted on the multimedia substrate 200 at predetermined intervals. When the backup safety-related application executing unit 18 detects that the safety-related application executing unit 14a stops working, the backup safety-related application executing unit 18 immediately starts working as the backup of the safety-related application executing unit 14a.

Just after the backup safety-related application executing unit 18 starts working, the backup safety-related application executing unit 18 first loads images of safety-related applications in the backup fixed-image drawing area 16a via the backup image-drawing-area managing unit 17. At this time, it is only fixed images of safety-related applications with high and medium levels of urgency that the backup safety-related application executing unit 18 loads in the backup fixed-image drawing area 16a, and thereby compactifying a redundant portion as much as possible.

When it is determined that a safety-related application is to be executed based on an input signal received via the backup input interface unit 19, the backup safety-related application executing unit 18 outputs a display request of an image of the safety-related application to the application final-adjusting unit 11c. When the application final-adjusting unit 11c determines that the image of the safety-related application is to be displayed, the image of the safety-related application is read out from the backup fixed-image drawing area 16a, and displayed on the display device 21 by the display control unit 11d.

In this manner, when an image of a safety-related application with a high level of importance is displayed, a shutdown of the system is not to be allowed, so that a redundant configuration is employed. Therefore, even if the multimedia substrate 200 has a trouble, at least a fixed image of a safety-related application can be displayed. Consequently, it is possible to improve the availability, reliability, and robustness of the system.

In the third embodiment, the monitoring of the multimedia substrate 200 is performed by the backup safety-related application executing unit 18. Alternatively, it is possible to provide a status monitoring unit exclusively for monitoring the multimedia substrate 200. Moreover, in the third embodiment, the monitoring of the multimedia substrate 200 is performed to detect a status of the safety-related application executing unit 14a. Alternatively, the monitoring of the multimedia substrate 200 can be performed to detect all statuses of the image-drawing-area managing unit 11a, the safety-related application image drawing area 12, the safety-related application executing unit 14a, and the input interface unit 15.

Figure 18:
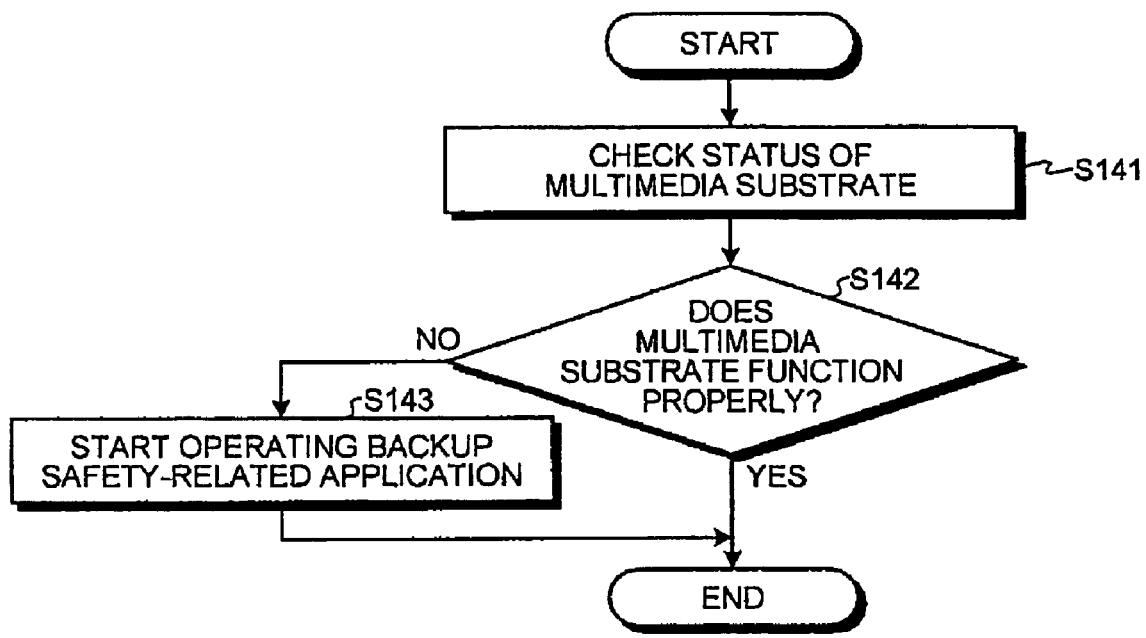
FIG. 18 is a flowchart of a process of monitoring a status of a multimedia substrate performed by the image display control apparatus shown in FIG. 17.

Subsequently, a process of monitoring a status of the multimedia substrate 200 performed by the image display control apparatus 10a is explained in detail below with reference to a flowchart shown in FIG. 18. The backup safety-related application executing unit 18 (or the status monitoring unit) checks a status of the multimedia substrate 200, particularly a status of any unit related to a safety-related application (Step S141). Then, the backup safety-related application executing unit 18 (or the status monitoring unit) further determines whether the multimedia substrate 200 functions properly (Step S142). When the backup safety-related application executing unit 18 (or the status monitoring unit) determines that the multimedia substrate 200 functions properly (YES at Step S142), the process is terminated. When the backup safety-related application executing unit 18 (or the status monitoring unit) determines that the multimedia substrate 200 does not function properly (No at Step S142), the backup safety-related application executing unit 18 (or the status monitoring unit) starts operating a backup safety-related application (Step S143).

In the image display control apparatuses 10 and 10a according to the first to third embodiments, an adjustment of an image to be displayed among a plurality of images by input signals is performed by the normal application adjusting unit 11b and the application final-adjusting unit 11c in two stages. Before any of the images by the input signals is displayed, image data of the images is preliminarily loaded in any of the fixed-image drawing area 12a, the variable-image drawing area 12b, and the image drawing area 13a. An image of a safety-related application includes important information for safe driving the vehicle 1 or 1a, so that the safety-related application executing unit 14a outputs a display request of the image of the safety-related application to the application final-adjusting unit 11c directly. On the other hand, information included in an image of a normal application is not so important, so that the normal application executing unit 14b outputs a display request of the image of the normal application to the application final-adjusting unit 11c via the normal application adjusting unit 11b. In other words, the normal application adjusting unit 11b adjusts a display request to be output to the application final-adjusting unit 11c, and outputs the adjusted display request to the application final-adjusting unit 11c.

In the image display control apparatuses 10 and 10a according to the first to third embodiments, an image of a safety-related application with a high or medium level of urgency can be displayed in a short time, for example, within 50 milliseconds just after a display request of the image starts being output. Moreover, an image of a safety-related application with a low level of urgency can be displayed in a relatively short time, for example, within 150 milliseconds just after a display request of the image starts being output. According to a conventional technology, it takes a relatively long time, for example, about 200 milliseconds to 250 milliseconds from when a display request of an image of a safety-related application starts being output till when the image is actually displayed. Therefore, the image display control apparatuses 10 and 10a according to the first to third embodiments can immediately display an image of a safety-related application.

Furthermore, in the image display control apparatuses 10 and 10a according to the first to third embodiments, when image data of an image of a normal application requested to be displayed has been already drawn while an output of the image to the display device is being adjusted, the image of the normal application can be displayed on the display device in a relatively short time, for example, in about 160 milliseconds just after a display request of the image starts being output. At the time of an output of a display request of an image, when the same image data of the image has been already drawn in the past, i.e., when the same image data of the image is stored in the image drawing area, the image can be displayed in a relatively short time, for example, in about 100 milliseconds just after the display request of the image starts being output. According to a conventional technology, it takes a relatively long time, for example, about 100 milliseconds to 300 milliseconds from when a display request of an image of a normal application starts being output till when the image is actually displayed. Therefore, the image display control apparatuses 10 and 10a according to the first to third embodiments can immediately display an image of a normal application.

Each of the processes explained to be automatically performed in the embodiments can be manually performed in whole or part. Likewise, each of the processes explained to be manually performed in the embodiments can be automatically performed in whole or part with a generally-used method. Moreover, processing procedures, controlling procedures, specific names, data, parameters, information including numerical values, and setting information described in the embodiments are illustrative only, and can be changed except as otherwise specified.

In addition, each of elements included in the apparatus is conceptually depicted in the drawings, so that the elements need not be physically arranged as shown in the drawings. Therefore, each of the elements can be fully or partially dispersed or integrated functionally or physically depending on loads or usage statuses in any unit.

Furthermore, each of processing functions can be fully or partially realized by a central processing unit (CPU), a micro computer, such as a micro processing unit (MPU) and a micro controller unit (MCU), or a computer program to be analyzed and executed by the CPU or the micro computer, or realized as a hardware with a wired logic.

As described above, according to an aspect of the present invention, after image data on each of images is loaded in an image memory, an image to be displayed on a display device is determined based on display priorities assigned to the images. Therefore, it is possible to display the image determined to be displayed immediately.

Furthermore, according to another aspect of the present invention, image data of a danger warning image for warning a danger in driving a vehicle is preliminarily loaded in the image memory. Therefore, it is possible to display the danger warning image immediately.

Moreover, according to still another aspect of the present invention, a display-image determining unit includes a first display-image determining unit and a second display-image determining unit to determine an image to be displayed in two stages. The first display-image determining unit determines a normal information image to be displayed on the display device. The second display-image determining unit determines a danger warning image to be displayed in priority to the normal information image on the display device. The second display-image determining unit determines not the normal information image but the danger warning image only. Therefore, it is possible to determine an image to be displayed efficiently and immediately. Consequently, it is possible to display a danger warning image immediately.

Furthermore, according to still another aspect of the present invention, a danger warning image with the highest display priority is displayed on the display device. When a plurality of danger warning images with the same display priority are requested to be displayed, the danger warning image requested to be displayed last is displayed on the display device. Therefore, criteria for determining one of the danger warning images to be displayed can be clarified in a simplified manner.

Moreover, according to still another aspect of the present invention, image data of a normal information image is preliminarily loaded in the image memory before the normal information image is requested to be displayed. Therefore, when the normal information image is determined to be displayed by the display-image determining unit, it is possible to display the normal information image on the display device immediately.

Furthermore, according to still another aspect of the present invention, when a danger warning image is requested to be displayed, image data of an additional image is synthesized into the image data of the danger warning image preliminarily-loaded in the image memory. Therefore, it is possible to speed up a display of the danger warning image with keeping the flexibility of the display of the danger warning image. In addition, the image data of the additional image is loaded in the image memory when the danger warning image is requested to be displayed, so that the image memory is used only when needed. Therefore, it is possible to reduce a capacity of the image memory.

Moreover, according to still another aspect of the present invention, when image data of a normal information image requested to be displayed by a normal-information-image display requesting unit has been already loaded in the image memory, an image-data loading unit can skip a process of loading the image data. Therefore, it is possible to perform processes efficiently and immediately.

Furthermore, according to still another aspect of the present invention, a plurality of normal information images with the same display priority can be displayed on a display screen of the display device all together.

Moreover, according to still another aspect of the present invention, depending on predetermined criteria of each of images, each of the images can be displayed on a display device selected from a plurality of display devices.

Furthermore, according to still another aspect of the present invention, a redundant configuration is employed in an input unit, a danger-warning-image display requesting unit, an image memory, an image-data loading unit. Therefore, it is possible to improve the availability and reliability of a display of a danger warning image.

Moreover, according to still another aspect of the present invention, a danger-warning-image display requesting unit stores therein image data of a danger warning image, and a normal-information-image display requesting unit stores therein image data of a normal information image. Therefore, when image data of a different type of an image is requested to be displayed, an image display requesting unit can be added to store therein the image data. Therefore, it is possible to add a type of an image display requesting unit easily. Thus, the loadability of the image display control apparatus can be improved flexibly.

Furthermore, according to still another aspect of the present invention, it is possible to output a sound in synchronization with an output of an image to the display device. Therefore, it is possible to improve an effect of the display image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. an image display control apparatus that controls a display of an image on a display device based on a priority of the image from among a plurality of images requested to be displayed based on signals input from a plurality of in-vehicle units mounted on a vehicle via an input unit, the plurality of images include danger-warning images for warning dangers in driving the vehicle based on the signals input from the in-vehicle units, the image display control apparatus comprising:
- an image-data loading unit that loads image data of an image requested to be displayed based on an input signal in an image memory;
- a display-image determining unit that determines an image to be displayed on the display device based on the priority; and
- an image-data output unit that reads out the image data of the image determined to be displayed by the display-image determining unit from the image memory, and outputs read image data to the display device, wherein
- the image-data loading unit loads the image data in the image memory before it is determined to display the image data on the display device based on the priority.

2. The image display control apparatus according to claim 1, further comprising:
- a danger-warning-image display requesting unit that requests a display of a danger warning image for warning a danger in driving the vehicle based on the signals input from the in-vehicle units; and
- a normal-information-image display requesting unit that requests a display of a normal information image that differs from the danger warning image based on the signals input from the in-vehicle units, wherein
- the image-data loading unit loads in advance image data of the danger warning image requested to be displayed by the danger-warning-image display requesting unit in the image memory.

3. The image display control apparatus according to claim 2, wherein the display-image determining unit includes
- a first display-image determining unit that determines, when a plurality of normal information images are requested to be displayed by the normal-information-image display requesting unit, one of the normal information images to be displayed on the display device based on a priority assigned to each of the normal information images, and
- a second display-image determining unit that determines to display the danger warning image requested to be displayed by the danger-warning-image display requesting unit in priority to the normal information image determined to be displayed by the first display-image determining unit on the display device.

4. The image display control apparatus according to claim 3, wherein
- the danger warning image includes a plurality of types of images having different priorities,
- when there is a plurality of requests for displaying the danger warning image, the second display-image determining unit determines to display a danger warning image with highest priority on the display device, and
- when there two or more danger warning images with same priority requested to be displayed by the danger-warning-image display requesting unit, the second display-image determining unit determines to display a last requested danger warning image.

5. The image display control apparatus according to claim 3, wherein the image-data loading unit loads the image data of the normal information image requested to be displayed by the normal-information-image display requesting unit in the image memory before the first display-image determining unit determines the normal information image to be displayed on the display device.

6. The image display control apparatus according to claim 2, wherein the image-data output unit includes an additional-image-data synthesizing unit that synthesizes image data of an additional image into the image data of the danger warning image loaded in advance in the image memory upon the danger warning image being requested to be displayed.

7. The image display control apparatus according to claim 6, wherein when the image data of the normal information image requested to be displayed by the normal-information-image display requesting unit is already loaded in the image memory, the image-data loading unit does not load the image data in the image memory.

8. The image display control apparatus according to claim 2, wherein the image-data output unit includes an image-data synthesizing unit that synthesizes image data of a plurality of normal information images with priorities higher than a predetermined level of priority so that the normal information images can be displayed together on a display screen of the display device.

9. The image display control apparatus according to claim 1, wherein
- the vehicle includes a plurality of display devices, and
- the image-data output unit includes a display-device determining unit that determines a display device for displaying each of the images requested to be displayed, based on predetermined criteria for the images.

10. The image display control apparatus according to claim 1, further comprising:
- a backup input unit that receives the signals input from the in-vehicle units;
- a backup danger-warning-image display requesting unit that requests a display of a danger warning image for warning a danger in driving the vehicle based on the signals received by the backup input unit; and
- a backup image-data loading unit that loads image data of the danger warning image requested to be displayed by the backup danger-warning-image display requesting unit in a backup image memory, wherein
- when at least one of the input unit, the danger-warning-image display requesting unit, the image memory, and the image-data loading unit in malfunctioning, the backup image-data loading unit loads in advance the image data of the danger warning image requested to be displayed by the backup danger-warning-image display requesting unit in the backup image memory based on the signals received by the backup input unit, and
- the image-data output unit reads out the image data of the image determined to be displayed on the display device by the display-image determining unit from the backup image memory, and outputs read image data to the display device.

11. The image display control apparatus according to claim 2, wherein the danger-warning-image display requesting unit stores therein the image data of the danger warning image,
- the normal-information-image display requesting unit stores therein the image data of the normal information image, and
- the image-data loading unit receives the image data of the danger warning image from the danger-warning-image display requesting unit to load the image data of the danger warning image in the image memory, and receives the image data of the normal information image from the normal-information-image display requesting unit to load the image data of the normal information image in the image memory.

12. The image display control apparatus according to claim 1, further comprising a sound-output control unit that controls an output of a sound to be synchronized with an output of an image to the display device by the image-data output unit.

* * * * *